(12) United States Patent
Putz

(10) Patent No.: US 12,084,025 B2
(45) Date of Patent: Sep. 10, 2024

(54) BRAKE SYSTEM

(71) Applicant: GREENBRAKES GMBH, Hartberg (AT)

(72) Inventor: Michael Putz, Sebersdorf (AT)

( * ) Notice: Subject to any disclaimer, the term of this patent is extended or adjusted under 35 U.S.C. 154(b) by 462 days.

(21) Appl. No.: 17/415,219

(22) PCT Filed: Dec. 17, 2019

(86) PCT No.: PCT/EP2019/085572
§ 371 (c)(1),
(2) Date: Jun. 17, 2021

(87) PCT Pub. No.: WO2020/127210
PCT Pub. Date: Jun. 25, 2020

(65) Prior Publication Data
US 2022/0073039 A1    Mar. 10, 2022

(30) Foreign Application Priority Data
Dec. 17, 2018  (AT) .............. A 51122/2018

(51) Int. Cl.
*B60T 8/172* (2006.01)
*B60L 7/10* (2006.01)
(Continued)

(52) U.S. Cl.
CPC .............. *B60T 8/172* (2013.01); *B60T 8/171* (2013.01); *B60T 8/58* (2013.01); *B60T 13/746* (2013.01);
(Continued)

(58) Field of Classification Search
CPC ........ B60T 17/221; B60T 8/172; B60T 8/171; B60T 8/58; B60T 13/746; B60T 2210/10;
(Continued)

(56) References Cited

U.S. PATENT DOCUMENTS 5,596,513 A * 1/1997 Schricker .................. G01L 3/24
703/2
2005/0077783 A1  4/2005 Suzuki et al.
(Continued)

FOREIGN PATENT DOCUMENTS

DE          3502050 A1   7/1986
DE    102010043320 A1   5/2012
(Continued)

OTHER PUBLICATIONS

Office Action in Austria Application No. A 51122/2018, mailed Sep. 17, 2019, 4 pages.
International Search Report and Written Opinion in International Application No. PCT/EP2019/085572, mailed Mar. 11, 2020, 16 pages.

*Primary Examiner* — Jason Holloway
*Assistant Examiner* — Christopher A Buksa
(74) *Attorney, Agent, or Firm* — Liang & Hennessey LLP; Brian Hennessey

(57) ABSTRACT

The invention relates to a brake system comprising at least one brake with a frictional surface, a pad carrier with a brake pad, and a control and monitoring unit. According to the invention, the brake system additionally comprises a brake temperature sensor which is connected to the control and monitoring unit that is designed to ascertain brake temperature maintenance values on the basis of the brake effectiveness request, to compare a temperature ascertained by the brake temperature sensor with corresponding brake temperature maintenance values, and to ascertain at least one correction factor on the basis of a deviation. The control and monitoring unit is additionally designed to correct the brake control signal by the at least one correction factor and to actuate the controller using the corrected brake control signal.

18 Claims, 1 Drawing Sheet

(51) Int. Cl.
  *B60T 8/171* (2006.01)
  *B60T 8/58* (2006.01)
  *B60T 13/74* (2006.01)
  *B60T 17/22* (2006.01)
  *F16D 66/00* (2006.01)

(52) U.S. Cl.
  CPC ............ *B60T 17/221* (2013.01); *F16D 66/00* (2013.01); *B60L 7/10* (2013.01); *B60T 2210/10* (2013.01); *B60T 2210/30* (2013.01); *B60T 2240/00* (2013.01); *B60T 2270/10* (2013.01); *B60T 2270/30* (2013.01); *F16D 2066/001* (2013.01)

(58) Field of Classification Search
  CPC ............ B60T 2210/30; B60T 2240/00; B60T 2270/10; B60T 2270/30; B60L 7/10; F16D 66/00; F16D 2066/001
  See application file for complete search history.

(56) References Cited

U.S. PATENT DOCUMENTS

| | | |
|---|---|---|
| 2007/0194623 A1 | 8/2007 | Miyazaki |
| 2009/0187320 A1 | 7/2009 | Antanaitis et al. |
| 2009/0195058 A1 | 8/2009 | Jackson et al. |
| 2010/0131166 A1 | 5/2010 | Fuchs et al. |
| 2011/0144845 A1* | 6/2011 | Takenaka ................ B60L 15/20 701/22 |
| 2014/0025271 A1 | 1/2014 | Fahland et al. |
| 2016/0221550 A1* | 8/2016 | Murata .................. B60T 7/042 |
| 2019/0107163 A1* | 4/2019 | Medinei ................ F16D 66/026 |

FOREIGN PATENT DOCUMENTS

| | | |
|---|---|---|
| DE | 102011111592 A1 | 2/2013 |
| DE | 102013213922 A1 | 1/2014 |
| DE | 102016200614 A1 | 7/2017 |
| EP | 1384638 A2 | 1/2004 |

* cited by examiner

BRAKE SYSTEM

CROSS-REFERENCE TO RELATED APPLICATIONS

The present application is a national phase application of PCT Application No. PCT/EP2019/085572, filed Dec. 17, 2019, entitled "BRAKE SYSTEM", which claims the benefit of Austrian Patent Application No. 51122/2018, filed Dec. 17, 2018, each of which is incorporated by reference in its entirety.

BACKGROUND OF THE INVENTION

1. Field of the Invention

The invention relates to a brake system including at least one brake.

2. Description of the Related Art

It has been shown that the actuation of a brake, in which braking is actually to take place with a certain braking torque or an otherwise specified braking effect, is associated with numerous problems in practice, which is why up to now it has only been possible to operate a brake system, particularly an electromechanical brake system, safely and predictably with a great deal of effort.

The most interesting or relevant variable for the control of such a brake system is the braking force or a braking torque, whether between tire and road or between brake disc and friction surface. For the control of such a brake system, it would be desirable in itself if the respective prevailing values for the occurring braking force or braking torque were known to a control and monitoring unit of the respective brake system. However, the braking force or braking torque that actually occurs during a braking process can only be measured in reality with considerable effort, even under research and development conditions. However, the braking force or braking torque cannot be measured in practice with a reasonable effort. In addition to the fact that the measurement of this force or torque is already very complex under research and development conditions, the fact that the brake system of a vehicle is a safety-critical system, the function and fail-safe operation of which are subject to special requirements, makes it even more difficult. A respective measuring system would not only have to have a high degree of accuracy, but also have to be designed with multiple redundancy. The control of a real brake system of a mass-produced product for not specially trained end users is therefore not possible by means of measuring the occurring braking forces or braking torques.

The braking torque is—if coefficients of friction and dimensions of the brake pad and brake disc involved are known—directly proportional to the contact force the at least one brake pad applies to the brake disc. In practice, however, neither the coefficients of friction nor the contact force are known with sufficient accuracy.

In itself, the contact force could be determined directly by means of a force sensor, particularly a so-called normal force sensor or a standard force measuring system, and incorporated into a respective control system. However, a force measurement system would also have to meet the very high requirements in terms of accuracy, failure safety, and redundancy.

In the case of an electromechanical brake, the braking torque can already be estimated without using a force measuring system via the current consumption of the electric motor, which serves as the drive for the mechanics of the brake system that presses the at least one brake pad against the brake disc. However, it has been shown that in practice this is too inaccurate to control or regulate the actuation of a brake solely via its current consumption. The electric motor in question does not act directly or immediately on the brake pad, but drives a mechanical system whose properties are subject to constant change. It is in the nature of a vehicle to move from one place to another in a short time. Both the ambient conditions and the conditions on the vehicle itself change, for example due to changes in temperature, humidity, the volume and detailed composition of the lubricants in the brake system, as well as contamination. Due to these constant changes, control based solely on the current consumption of the electric motor is not possible in practice.

SUMMARY OF THE INVENTION

It is therefore the problem of the invention to indicate a brake system of the type mentioned at the outset, with which the disadvantages mentioned can be avoided, and in which a predeterminable braking effect can be set as accurately as possible with little metrological effort.

This problem is solved, according to the invention.

This means that a specified braking effect can be set and checked very precisely with little metrological effort.

This means that it is no longer necessary to determine the prevailing or occurring braking forces or braking torques by measurement. Instead, the temperature in the area of the brake is determined. Instead of determining a braking force or braking torque from this temperature, the temperature or heating curve of the brake is determined based on the specification of the braking effect. Since it is known exactly where the individual parts of the brake are located, and also the thermal properties of the individual parts of the brake are known, as well as the location and characteristics of the at least one temperature sensor, it is possible to calculate very precisely according to which curve the temperature of the brake should rise when it actually brakes with the expected force. A current braking process can then be tracked based on this expectation value.

As a result, deviations from a target braking force or a target braking torque can be detected and compensated for quickly and reliably—even during the braking process itself. This enables precise control or regulation of a brake system or a braking process.

The brake friction force can be indirectly determined very easily and with little effort via its effects. In addition to the temperature sensor used, other sensors can be used which are already part of a vehicle equipped with the brake system, such as at least one acceleration sensor and/or speed sensor and/or inclinometer. The accuracy of the determined brake friction force can be further increased by linking the determined effects.

By comparing an expected braking effect with an actual braking effect and taking into account a respective deviation in the further control or regulation of the brake system, all causes of such a deviation are also taken into account—within certain system-related limits. This also compensates for elasticities or deformations of individual parts of the brake system without having to know them precisely.

Furthermore, static/slip friction transitions are also taken into account. If there is a change in the braking effect request, the changed brake control signal is readjusted by the control and monitoring unit or adapted by means of the at least one correction factor until a corresponding change is also detected by the control and monitoring unit. Of course, hysteresis and/or a non-linear transmission ratio of the involved, particularly mechanical, components can already be taken into account when the brake control signal is formed by the control and monitoring unit.

This means that changes to the brake system, which may have occurred between decommissioning of the brake system and its recommissioning and/or during operation, can be reliably detected and taken into account. This makes it possible to control the brake on the basis of a specified braking effect in such a way that this braking effect is actually achieved, without the need for a complex and error-prone force measurement system. However, a simple, inexpensive, or non-safety-relevant force measurement system can certainly be part of the brake system.

This brake system has a simple design and is very reliable in operation, since very robust and correspondingly fail-safe sensors can be used.

Particularly preferably, the present invention further relates to a vehicle with a brake system according to claim 15, wherein the brake system comprises at least two brakes. In this version, both brakes are controlled to the same target value. This can prevent unintentional different braking of wheels on both sides of the vehicle. This also prevents that, while identical conditions occur at both brakes, these are different from the target. This can prevent mutual build-up or misalignment.

This invention further relates to a method for actuating a brake system including at least one brake.

It is therefore the problem of the invention to indicate a method of the type mentioned above, with which the disadvantages mentioned can be avoided, and in which a predeterminable braking effect can be set as accurately as possible with little metrological effort.

This problem is solved, according to the invention, by the features described herein.

In this manner, the advantages claimed above for the brake system can be achieved.

The dependent claims relate to other advantageous embodiments of the invention.

Express reference is hereby made to the wording of the patent claims, whereby the claims are incorporated by reference into the description at this point and are deemed to be reproduced verbatim.

BRIEF DESCRIPTION OF THE DRAWINGS

The invention is described in more detail with reference to the accompanying drawings, in which only preferred embodiments are shown by way of example. Wherein.

DETAILED DESCRIPTION

Figure 1:
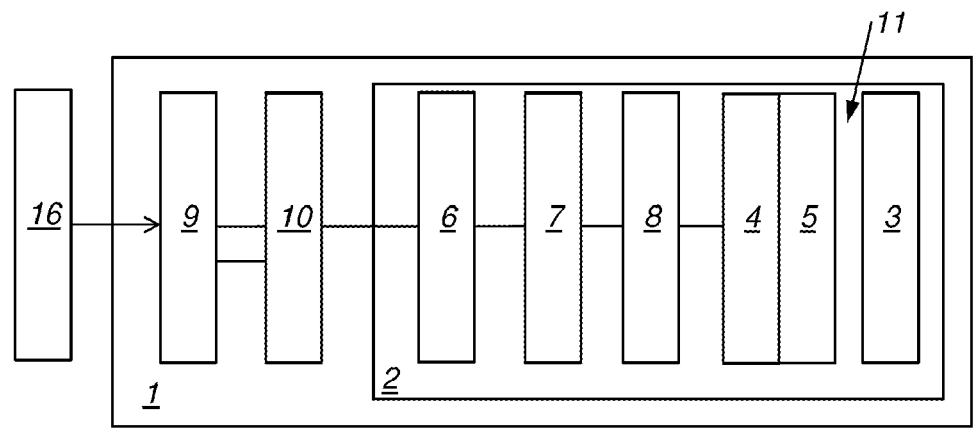
FIG. 1 shows a block diagram of a first embodiment of a respective brake system.

FIG. 1 shows a block diagram of a preferred embodiment of a brake system 1 comprising at least one electromechanical brake 2, wherein the electromechanical brake 2 has
at least one friction surface 3,
at least one pad carrier 4 with at least one brake pad 5,
at least one electric motor 6 for specifiable movement of the pad carrier 4,
an actuating mechanism 7, on which the pad carrier 4 is mounted and which is connected to the electric motor 6, and
preferably at least one mechanical adjustment device 8 connected to the actuating mechanism 7,
wherein the brake system 1 has a control and monitoring unit 9 which is designed to receive a braking effect request on the input side and to generate a brake control signal on the basis of the braking effect request and to output it to a controller 10 of the brake 2, wherein the brake system 1 comprises at least one brake temperature sensor 15, which is preferably arranged on the at least one pad carrier 4 and/or the friction surface 3 and/or the brake pad 5 and/or the actuating mechanism, and preferably the adjusting device 8, which brake temperature sensor 15 is communicatively connected to the control and monitoring unit 9, and in that the control and monitoring unit 9 is designed to determine a temporal sequence of brake temperature expectation values on the basis of the braking effect request, and furthermore to compare a temperature determined by the brake temperature sensor 15 with a temporally corresponding value of the brake temperature expectation values, and to determine at least one correction factor on the basis of a predeterminable deviation of the determined temperature from the corresponding value of the brake temperature expectation values, and to correct the brake control signal by the at least one correction factor, and to actuate the controller 10 using the corrected brake control signal.

Herein, an electromechanical brake system is described as a particularly preferred embodiment of brake system 1. However, this brake system 1 may also be a hydraulic or a pneumatic brake system 1. Accordingly, all preferred embodiments and the respective parts of the description also apply to a hydraulic or pneumatic brake system 1, however using the electric motor 6 is not mandatory.

This means that a specified braking effect can be set very precisely with low metrological effort.

This means that it is no longer necessary to determine the prevailing or occurring braking forces or braking torques by measurement. Instead, the temperature in the area of the brake 2 is determined. Instead of determining a braking force or braking torque from this temperature, the temperature or heating curve of the brake 2 is determined based on the specification of the braking effect. Since it is known exactly where the individual parts of the brake 2 are located, and the thermal properties of the individual parts of the brake 2 are known as well, as well as the location and characteristics of the at least one brake temperature sensor 15, the curve according to which the temperature of the brake 2 should increase if it actually brakes with the expected force can be calculated very precisely. A current braking process can then be tracked based on this expectation value.

In this case, due to the thermal resistance and the heat capacity, the heating-up of the friction surface 3 can be assumed or represented as a low-pass filter, at the output of which a further low-pass filter is arranged to the measuring point, therefore to the location where the brake temperature sensor 15 is located. It is particularly assumed that the thermal resistances correspond to a black body. Preferably, the thermal resistances also take into account air cooling and/or wheel speed-dependent cooling (internal ventilation). Furthermore, the thermal resistors include at least one independent, always effective portion of heat dissipation. Not all of the parts listed here must actually be included in the models or calculations used to determine the expectation values.

As a result, deviations from a target braking force or a target braking torque can be detected and compensated for quickly and reliably—even during the braking process itself. This enables precise control or regulation of a brake system 1 or a braking process.

The brake friction force can be indirectly determined very easily and with little effort via its effects. In addition to the temperature sensor 15 used, other sensors can be used which are already part of a vehicle equipped with the brake system 1, such as at least one acceleration sensor and/or speed sensor and/or inclinometer. The accuracy of the determined brake friction force can be further increased by linking the determined effects.

By comparing an expected braking effect with an actual braking effect and taking into account a respective deviation in the further control or regulation of the brake system 1, all causes of such a deviation are also taken into account—within certain system-related limits. This also compensates for elasticities or deformations of individual parts of the brake system 1 without having to know them precisely.

Furthermore, static/slip friction transitions are also taken into account.

If there is a change in the braking effect request, the changed brake control signal is readjusted by the control and monitoring unit 9 or adapted by means of the at least one correction factor until a corresponding change is also detected by the control and monitoring unit 9. Of course, hysteresis and/or a non-linear transmission ratio of the, particularly mechanical, components involved can already be taken into account when the brake control signal is formed by the control and monitoring unit 9. In the case of a respective non-linear transmission ratio, it is preferred that such a ratio is designed in such a way that the brake pad 5 is moved at a higher speed to bridge an air gap up to the friction surface 3 than when it is already in contact with the friction surface 3 during a braking process. This method is particularly advantageous for such a non-linear transmission ratio, since an incorrectly adjusted air gap has greater effects than linear brakes 2 would have.

This means that changes to the brake system 1, which may have occurred between decommissioning of the brake system 1 and its recommissioning and/or during operation, can be reliably detected and taken into account. This makes it possible to actuate the brake 2 on the basis of a specified braking effect in such a manner that this braking effect is actually achieved, without the need for a complex and error-prone force measurement system. This brake system 1 has a simple design and is very reliable in operation, since very robust and respectively fail-safe sensors can be used.

The present invention relates to an electromechanical brake system 1 which comprises at least the electromechanical brake 2 proper and a control and monitoring unit 9 required for its operation, as well as a brake temperature sensor 15. The part of the control and monitoring unit 9 for processing the data from the brake temperature sensor 15 may also be referred to as the brake friction force action sensor unit 20.

The electromechanical brake system 1 is designed to brake a relative movement between two parts. Particularly, this brake system 1 is designed to brake at least one rotating component. This can as such be any type of rotating component, although the brake 2 can also be provided for braking linear movements. As such, this brake system 1 may, for example, be part of an escalator, an elevator, or a wind turbine. Particularly, the brake system 1 is intended to be installed in, or to be a part of, a vehicle, particularly a single-track or multi-track vehicle. This can be any type of wheeled or tracked vehicle. Particularly, the vehicle is at least one vehicle selected from the group of: Automobiles, airplanes, motorcycles, car trailers, tractors, rail vehicles. The brake system 1 can be provided, for example, for braking drive wheels, or also for braking other moving parts of a device or vehicle. For example, its use can be intended as a brake of a rope drum of a crane.

In the present context, an electromechanical brake 2 can be any type of brake 2 in which the actuation of the brake 2, hence the movement of the brake pad 5 in the direction of the friction surface 3 during braking or the release of the brake 2, is effected by the drive using an electric motor 6. The movement generated directly by the electric motor 6 is deflected by means of a mechanism, the so-called actuating mechanism 7. A brake 2 which is actually actuated by means of hydraulics or pneumatics is considered an electromechanical brake 2, even if the operating pressure of the fluid used is generated with an electrically driven pump, and/or if electrically operated valves are used.

The terms controlling and regulating are used in the same way.

The electric motor 6 may be any form of electric motor 6, such as a linear motor, a rotary machine, a DC motor, or an AC motor, etc. It is preferred that the electric motor 6 is a rotary machine. It is particularly preferred that the electric motor 6 is designed as a brushless DC motor. Such an electric motor 6 is also referred to in English as a BLDC motor, where BLDC—in a manner known per se—stands for brushless direct current.

The electromechanical brake system 1 has at least one controller 10 to actuate the electric motor 6 or to enable respective control of the electric motor 6. The controller 10 or the control unit is electrically connected to the electric motor 6, and for example comprises an inverter circuit or bridge circuit. The controller 10 can be designed as any desired controller and according to any desired process, as long as the controller is particularly designed or able to control a position and/or a torque. The controller 10 must of course be technically capable of controlling the electric motor 6 selected in each case.

In the preferred embodiment of the electric motor 6 as a BLDC motor, the controller 10 is preferably designed as a controller 10 specially designed or provided for BLDC motors. Such controllers 10, which include position, torque and speed control, are well known in the relevant technical field of BLDC motor control. Particularly, such a controller 10 transmits position, torque limitation, and speed limitation simultaneously to the control and monitoring unit 9.

Furthermore, the controller 10 can be designed as a vector controller. A vector controller is also called FOC, which stands for field-oriented control.

Furthermore, a controller 10 may be designed comprising at least one PID controller.

Of course, a brake 2 may have more than one electric motor 6. Preferably, it can be provided that the brake 2 further comprises a second electric motor not shown in the figures, which second electric motor can be designed or can comprise a respectively self-locking gear, such as a spindle drive or a worm gear, such that it can maintain a specifiable torque even in the absence of current. This makes it easy to achieve a parking brake function. The second electric motor can be operated according to all embodiments or methods as described for the electric motor 6. Particularly, the correction factors determined for one of the two electric motors are also taken into account when operating the other of the two electric motors. Particularly, when the optional second electric motor is used to implement a parking function, this can ensure that the brake pad 5 is pressed onto the friction surface 3 with sufficient but not excessive force.

In this context, it is also possible to actuate a second electric motor of this type during an operational braking process in such a manner that it causes part of the movement of the pad carrier 5, for example in the form of a rough adjustment of the position of the pad carrier 5, and that the first electric motor 6 performs the fine adjustment of the pad carrier.

Of course, the second electric motor can also be provided merely for redundancy reasons, in order to ensure the function of the brake system 1 even if the electric motor 6 fails.

The electromechanical brake 2 has at least one friction surface 3 and at least one brake pad 5 for interacting with the friction surface 3. The friction surface 3 can particularly be designed as a brake disc of a disc brake or as a brake drum surface in a drum brake. Furthermore, the friction surface 3 can be in the form of a rail, for example if a linear movement is braked.

The at least one brake pad 5 is fastened to at least one pad carrier 4. Preferably, several brake pads 5 are provided per friction surface 3 for each brake 2.

The at least one electric motor 6 is connected to the pad carrier 4 by means of an actuating mechanism 7 in order to move the same, or the pad carrier 6 is mounted on the actuating mechanism 7. For example, the actuating mechanism 7 can be designed as part of a wedge brake or a ball screw brake or a ball ramp brake. Furthermore, the actuating mechanism 7 can have cams or eccentrics, each with specifiable elevation curves. However, the present invention can be implemented regardless of any particular embodiment of the actuating mechanism 7.

According to a preferred further development of the present invention, the actuating mechanism 7 further has a non-linear transmission ratio. This is to be understood as meaning that the actuating mechanism 7 has a mechanical input which is connected to the electric motor 6, that the actuating mechanism 7 has a mechanical output which is connected to the pad carrier 4, and that the actuating mechanism 7 is designed in such a manner that a movement at the input is related to a movement of the output via a specifiable non-linear relationship. In other words, a certain input-side displacement, hence a mechanical input variable, is not mapped by means of a linear relationship but by means of a non-linear relationship, to a displacement or movement of the pad carrier 4. Particularly, such a non-linear actuating mechanism 7 is designed in such a manner that a gap 11 between a rest position of the brake pad 5 and the friction surface 3 can be covered very quickly or with only slight movement of the electric motor 6. Particularly, the electric motor 6 is operated in an optimum range in which safe brake actuation is also possible over tolerances. It is also preferred that the electric motor 6 is operated in the area of a contact position of the brake pad 5 on the friction surface 3 in such a manner that the electric motor 6 is operated in an area in which it has its highest torque to be output.

Such a non-linear relationship can for example be achieved by means of at least one cam, which is shaped accordingly. A respective non-linearity is stored, preferably in the form of a transfer function or a transfer quantity, in a memory unit 13 of the brake system 1, and is available to the control and monitoring unit 9.

To bridge the gap 11 quickly, it is also possible to operate the electric motor 6 at an increased speed, if necessary by means of so-called field weakening.

The advantages of the mechanically achieved non-linearity can thus be supplemented in accordance with the process by exploiting such options of the electric motor 6, i.e., that the electric motor 6 is operated to this end at a higher speed but with a reduced motor torque, as is possible e.g. using field weakening or by switching the windings, e.g. pole pair numbers.

The pad carrier 4 is provided to perform a first movement in at least a first direction of movement or to be moved in such a first movement by means of the electric motor 6, as well as possibly after respective deflection by the actuating mechanism 7. Preferably, the first movement of the pad carrier 4 is considered to be its movement towards the friction surface 3.

The pad carrier 4 is further provided to be moved by means of the electric motor 6 in a second movement in at least a second direction of movement, wherein the second movement is directed opposite to the first movement. Preferably, the second movement of the pad carrier 4 is considered to be its movement away from the friction surface 3.

Preferably, the brake 2 further comprises at least one adjusting device 8 which is connected to the actuating mechanism 7, wherein this adjusting device 8 is provided only in particularly preferred embodiments. Mechanical adjusting devices 8 have been known in various designs for many decades, especially in the field of truck brakes, and are standard at least for truck brakes. Such an adjusting device 8 is also called a wear adjuster.

It has been shown that braking torques deviating from the expectation are often caused by an adjusting device 8 or the typical tolerances of an adjusting device 8. This knowledge can be applied in determining the correction factor by forming the correction factor in such a way that at least one specifiable tolerance of an adjusting device 8 is compensated. This means that a deviation can be compensated for very quickly or in a targeted manner.

The brake 2 also preferably has at least one mechanical energy store, which is designed particularly as a spring that acts at least indirectly on the pad carrier 4. Such springs in brakes are as such known and widespread. Such springs usually magnify a hysteresis effect between the behavior of the brake 2 during the first movement compared to the second movement. In the present brake system 1, this varying influence of the spring as well as its age-related changes, such as the spring stiffness, can also be detected and compensated for.

The brake system 1 has a control and monitoring unit 9, which is provided and appropriately designed to receive a braking effect request on the input side, and to generate a brake control signal on the basis of the braking effect request and output it to the controller 10 of the electric motor 6.

The control and monitoring unit 9 is particularly designed to comprise a microcontroller and/or microprocessor, wherein other electronic components or assemblies can be part of the control and monitoring unit 9. The control and monitoring unit 9 may also be used, at least in part, as part of a programmable logic component. Particularly, the control and monitoring unit 9 may comprise a plurality of parts or assemblies, wherein individual operations or processing steps are performed by specific parts of this plurality of parts or assemblies.

The control and monitoring unit 9 is designed to convert a request for deceleration of the speed or deceleration communicated by a human or artificial driver of a vehicle or a human or artificial operator of a machine to an interaction interface 16 of the respective vehicle or machine into a corresponding actuation of the electric motor 6 of the brake 2. The interaction interface 16 can be, for example, a sensor on the so-called brake pedal, a communication interface of a vehicle computer, or a control element on a control board. An input interface of the present brake system 1 is—as part of a vehicle—at least indirectly connected to the interaction interface 16 of the respective vehicle.

The brake system 1 further comprises at least one brake temperature sensor 15, which is preferably arranged on the at least one pad carrier 4 and/or the friction surface 3 and/or the brake pad 5 and/or the actuating mechanism, and preferably the adjusting device 8, which brake temperature sensor 15 is communicatively connected to the control and monitoring unit 9.

The temperature at the friction surface 3 is a function of the braking torque, the wheel speed, the cooling effect, and the time. The thermal power of brake 2 is the angular velocity multiplied by the braking torque. The braking torque can consequently be determined by determining the angular velocity via the measured wheel speed and the thermal power via the measurement of the temperature.

When measuring the temperature in question, the heat capacities and the thermal resistance of the components located in the vicinity of the friction surface 3 and, particularly, the heat capacities and the thermal resistance of the components located between the friction surface 3 and the brake temperature sensor 15 must be taken into account accordingly. The friction work and thus the integral of the frictional force on the brake 2 can be inferred very accurately by measuring a temperature as close as possible to the friction surface 3 or the brake pad 5. It is particularly preferred that the brake temperature sensor 15 is arranged on the at least one pad carrier 4 and/or the friction surface 3 and/or the brake pad 5 and/or the actuating mechanism, and/or the adjusting device 8. Furthermore, the at least one brake temperature sensor 15 is preferably arranged on a brake caliper and/or a housing of the brake 2. In addition, the brake temperature sensor 15 can be arranged on the electric motor 6 and/or the controller 10 and/or the control and monitoring unit 9.

In this context, the electric motor 6 preferably already has an internal or integrated temperature sensor. Such a temperature sensor of the electric motor 6 may serve the original purpose of monitoring the temperature of the electric motor 6. Advantageously, such a temperature sensor of the electric motor 6 can also be used as a brake temperature sensor 15. This allows an existing sensor to be used for multiple purposes, eliminating the need for another dedicated brake temperature sensor 15. When using the temperature sensor of the electric motor 6 as a brake temperature sensor 15, the self-heating of the electric motor 6 due to the electric current as well as the friction must be excluded. This is easily possible due to the high reproducibility of the operation of an electric motor 6.

The control and monitoring unit 9 determines a time sequence of brake temperature expectation values based on the braking effect request. The temperature values determined by the brake temperature sensor 15 are compared by the control and monitoring unit 9 with a temporally corresponding value of the brake temperature expectation values. Based on a predeterminable deviation of the determined temperature from the corresponding value of the brake temperature expectation values, the control and monitoring unit 9 generates at least one correction factor and corrects the brake control signal by the at least one correction factor. Furthermore, the controller 10 is actuated with the corrected brake control signal.

In a memory unit 13 connected to the control and monitoring unit 9, values for at least one thermal resistance and at least one thermal capacity of the brake 2 as well as relationships between braking effect request, braking torque, and thermal output are stored. Preferably, the control and monitoring unit 9 determines brake temperature expectation values based on these values and relationships.

Preferably, the control and monitoring unit 9 takes into account a specifiable time history, particularly a specifiable number of discrete-time temperature values, when forming the correction factor. This makes the entire control system much more stable and less prone to briefly changing its output based on individual measurement results.

Furthermore, the brake friction force action sensor unit 20 can be designed to record further brake friction force effects or can be connected to respective other sensors. The effect of the braking force or braking torque or a braking process to be detected can be any type of corresponding effect. As explained at the outset, it is technically difficult and also uneconomical to measure the braking force directly.

According to a first preferred further development, the at least one brake friction force action sensor unit 20 comprises at least one deceleration determination unit 21 for determining a deceleration of a device braked by the brake system 1. Deceleration or negative acceleration is a direct result of an effective actuation of the brake system 1.

In this context, the deceleration detection unit 21 particularly comprises at least one acceleration sensor 22, for example a piezoelectric acceleration sensor, whereby acceleration can be measured directly.

In addition or alternatively, it is also possible to determine the deceleration from a time derivative of a velocity difference or from a second derivative with respect to the time of a path difference. Accordingly, the deceleration determination unit 21 further preferably comprises at least one satellite navigation receiver 23, whereby the distance traveled can be determined simply and, moreover, independently of further sensors. Furthermore, the deceleration detection unit 21 preferably comprises at least one speed measurement system 24, such as this is a standard sensor in a road vehicle, whereby a speed difference can easily be determined.

Particularly preferably, the deceleration detection unit 21 may comprise at least two of the cited systems and combine their results.

According to a second preferred further development, the at least one brake friction force action sensor unit 20 comprises at least one position sensor 25, particularly at least one gyroscope and/or one inclinometer, wherein the at least one position sensor 25 is provided at least for measuring a pitch rate and/or a pitch angle of a device braked with the brake system 1. The position sensor 25 should be designed or arranged accordingly. Particularly in the case of road vehicles, braking causes the vehicle to pitch, and the degree of pitching—in the case of a specific vehicle type—can already be used to draw very precise conclusions about the braking force.

According to a third preferred further development, the at least one brake frictional force action sensor unit 20 has at least one deformation detection unit 26, and the deformation detection unit 26 is provided for detecting a deformation, particularly an elastic deformation, of at least one specifiable part, particularly a spring, of a device braked with the brake system 1. In this way, elastic deformations that occur on the mechanical parts of an object during the braking process can be detected and the braking force can be inferred. It may also be possible to measure the compression of a spring, such as a front suspension spring.

Particularly preferably, the brake friction force action sensor unit 20 comprises a specifiable plurality of the above-mentioned preferred embodiments, and that the measurement results determined in each case are combined with one another. This can be done with a specifiable statistical procedure. Preferably, the individual measurement results are combined using sensor data fusion. When combining the measurement results, it is also possible to evaluate individual sensors with variable weighting factors. For example, the data from a GPS device can be weighted depending on the position of the satellites.

A measurement signal output of the brake friction force action sensor unit 20 is connected to a measurement input of the control and monitoring unit 9. The brake friction force action sensor unit 20 determines effects occurring during a braking process, which are referred to as brake friction force effects. The control and monitoring unit 9 determines an actual braking effect from this at least one braking friction action. This can be done based on the known physical relationships.

Figure 2:
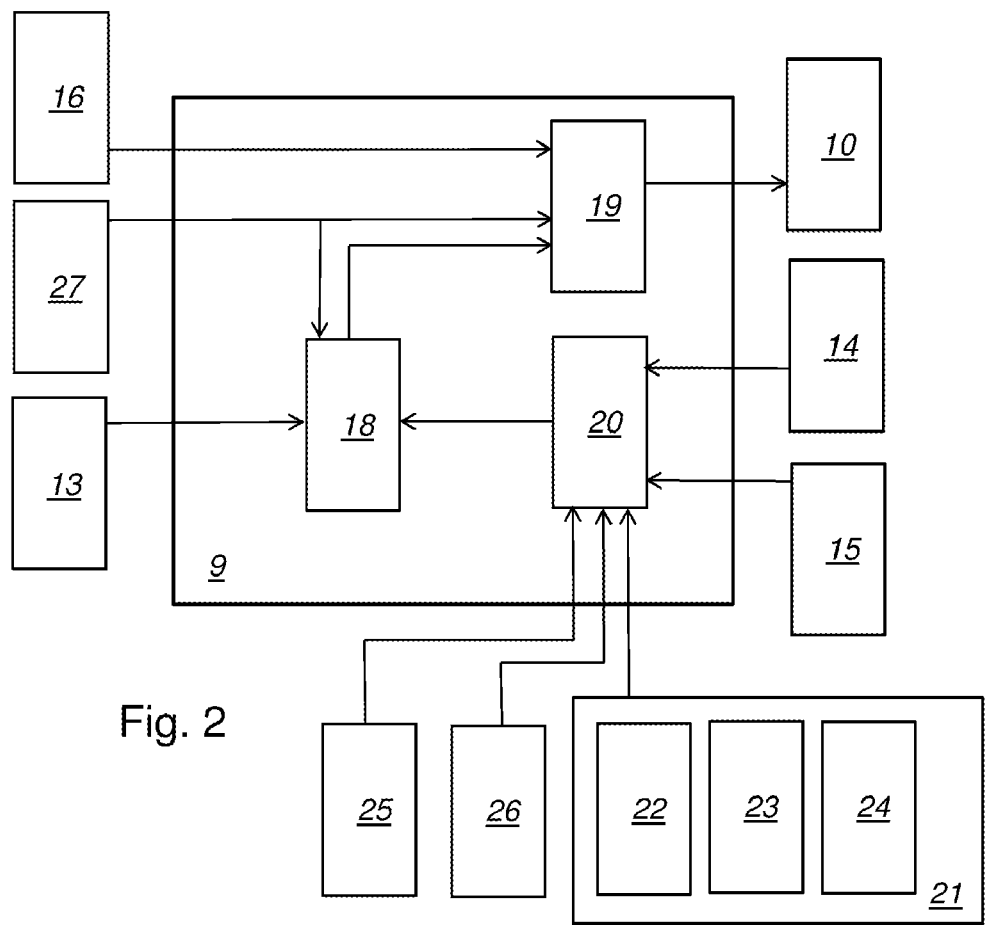
FIG. 2 is a block diagram of a part of a second embodiment of a respective brake system.

FIG. 2 shows a block diagram of such a system, wherein the brake friction force action sensor unit 20 is shown or designed as part of the control and monitoring unit 9. Of course, an independent or separate design of the two components is also possible.

In this context—and as shown in FIG. 2—the brake system 1 or a device to be braked, such as particularly a vehicle, has at least one mass determination unit 27. This mass determination unit 27 can, for example, be part of the brake friction force action sensor unit 20, or be connected to it or to the control and monitoring unit 9. The mass determination unit 27 is designed for at least approximately determining a mass of a device to be braked with the brake system 1.

For example, when the device to be braked is designed as a vehicle, the mass determination unit 27 may have stored the unladen mass of the vehicle in question as an initial value. Sensors in the springs and/or the seats, etc. can be used to infer a loading condition. Furthermore, the data of an motor control system can be used, since a heavily loaded vehicle requires more motor power to accelerate.

The control and monitoring unit 9 compares a braking effect request with the braking effect that actually occurs. When a specifiable deviation of the braking effect from the braking effect request occurs, the control and monitoring unit 9 determines at least one correction factor, particularly at least one correction factor quantity, preferably at least one correction curve. Furthermore, the control and monitoring unit 9 corrects the brake control signal by the at least one correction factor, particularly the correction factor quantity, preferably the correction curve, and actuates the controller 10 with the corrected brake control signal.

According to a preferred further development of a present brake system 1, at least one first temperature sensor 14 is assigned thereto, therefore that it is connected to at least one first temperature sensor 14 and/or that such a first temperature sensor 14 is part of the brake system 1 itself. The first temperature sensor 14 is connected to the control and monitoring unit 9. The sensors can detect the ambient temperature or temperatures in the brake 2 or electronics or the motor, depending on where they are located.

Preferably, correction factors are stored in the memory unit 13 in connection with predeterminable boundary conditions, particularly ambient temperature, operating time and mass of the device to be braked, and on the basis of respectively determined or measured values for at least one of these boundary conditions, a correspondingly suitable correction factor is already selected from the memory unit 13 during the first control of the brake 2, and the brake control signal is already corrected accordingly.

In this context, a specifiable plurality of thermal resistances are further stored in the storage unit 13, and the various thermal resistances represent speed- and/or ambient temperature-dependent cooling effects. This means that cooling effects resulting from airflow, the effect of the rims or similar repetitive effects can also be taken into account.

Particularly, the temperature is read in and taken into account in the course of the commissioning of the accordingly equipped vehicle. It is also preferred that reading in and taking into account of these values takes place at specifiable intervals and/or if a specifiable limit temperature interval is exceeded. This allows the brake system 1 to be adapted to the ambient conditions even before it is actuated for the first time or after it has not been used for some time. A particularly high accuracy of the temperature sensor 14 is not required, since it only helps to select so-called default values or settings for the operation of the brake system 1. As soon as the brake system 1 is in operation, the at least one correction factor is adjusted accordingly anyway. However, by preselecting suitable initial values, the control of brake system 1 can be accomplished with minor adjustments during braking.

In addition to the determination of an ambient temperature by means of a respective temperature sensor 14, it is also possible to determine other states of the environment and to incorporate them in the present control system. Particularly, these are moisture or wetness and wind. Rain or ground wetness can result in increased heat dissipation from the brake 2. Likewise, strong wind can improve heat dissipation. Preferably, a rain sensor and/or a soil moisture sensor and/or a wind sensor is provided and connected to the control and monitoring unit 9. In addition or alternatively, it is possible to determine a characteristic curve of temperature compensation, which is calculated according to a function $T\_((t))=e^{\char`\^}(-t/)$, wherein is the product of resistance or thermal resistance and capacitance or heat capacity in a manner known per se. Since the heat capacity of the brake 2 hardly changes even when it rains, it is therefore possible to conclude that thermal resistance has changed from a determined temperature curve. Preferably, such a determined current thermal resistance is taken into account when the controller 10 is actuated by the control and monitoring unit 9.

Furthermore, the brake system 1 may comprise at least one unit for determining an ambient air speed and/or a speed measuring system 24, which are connected to the control and monitoring unit 9. This can be a pitot tube, for example.

Preferably, a measured variable of a force sensor or a measured variable of a braking torque sensor is not included in the control or regulation of the brake system 1. Accordingly, the brake system 1 is preferably designed without a force sensor, particularly without a normal force sensor, and/or also functions without the measured values of a respective force sensor.

To determine the at least one correction factor, the control and monitoring unit 9 has a unit 18 which is designed to compare the determined real brake temperatures with the brake temperature expectation values and to form a respective correction value. This can be done in the context of digital signal processing in different variants, and need not be explained in detail.

The unit 18 is connected to a unit 19, which forms the brake control signal and outputs it to the controller 10.

The memory unit 13 also stores general data on a specific brake 2. These are particularly the nominal dimensions of the brake, as well as the nominal coefficients of friction. Furthermore, at least the last correction values determined before the respective brake system 1 was taken out of service are stored.

Particularly, it is intended that the newly determined data is immediately incorporated into the actuation of the electric motor 6.

The brake 2 can be controlled in two different ways, either as a so-called "position control" of the at least one brake pad 5, or by specifying a target braking torque, in the form of an motor torque to be achieved, if necessary taking into account a, particularly non-linear, transmission ratio.

In "position control," the motor position is specified, particularly as a length of an arc of rotation or as an angle or as a position of a specifiable part of the actuating mechanism 7 or of the pad carrier 4 or of the brake pad 5.

When specifying a target braking torque, this can also be referred to as "force-controlled" or force control or torque control, in the prior art a torque of the electric motor is usually specified.

A peculiarity of the so-called force control compared to the position control is that—when controlled via the torque of the electric motor—it tends to a significant hysteresis. If, in a situation in which the moving parts of the brake are at rest, for example while the brake pad 5 is being pressed against the friction surface 3, the control and monitoring unit 9 only determines or outputs a motor torque that is changed so slightly that the static friction within the actuating mechanism 7 is not exceeded, then there is no change in the braking effect despite the change in actuation, since the actuating mechanism 7 itself does not move.

A particular advantage of specifying a target braking torque is that the torque is proportional to the force of the brake pad 5 on the friction surface 3. When controlling via a target braking torque, the respective prevailing stiffness of the brake 2 or its parts has no effect. Instead, the control and monitoring unit 9 will strive to achieve the target braking torque. The brake friction force action sensor unit 20 also makes it easy to check whether this target braking torque is actually achieved. This means that static/slip friction transitions are no longer relevant.

It goes without saying that the control or regulation system takes into account any non-linear ratios of the actuating mechanism 7. For example, even a slight change in the torque of the electric motor 6 can lead to a considerable change in the contact pressure at the appropriate transmission ratio. However, since the respective transfer function of the actuating mechanism 7 is known to the control and monitoring unit 9, this is taken into account in control or regulation.

When the brake system 1 is installed in a vehicle, the accuracy of the braking effect can be further increased by linking the brake system 1 with sensors of the vehicle. In a further development, the vehicle can preferably have at least one sensor for determining an individual wheel speed and/or a wheel slip, particularly as part of an ABS and/or ESP of the vehicle, that the sensor is at least indirectly connected to the control and monitoring unit 9 of the brake system 1, that the control and monitoring unit 9 is further designed to compare the wheel speed or wheel slip determined by the sensor with at least one value for a corresponding operating behavior expectation during a braking process, and to adjust the at least one correction factor in the event of a specifiable deviation.

Preferably, the control and monitoring unit 9 is designed to connect the individual measured variables by means of so-called sensor fusion.

According to another preferred embodiment of a wheeled vehicle having the present brake system, the wheeled vehicle comprises a first brake system and a second brake system, wherein the first brake system is provided for braking a left wheel, and wherein the second brake system is provided for braking a right wheel. It is possible that individual components of the first brake system are also used by the second brake system, particularly the control and monitoring unit 9. In this context, a first brake control signal of the first or left brake system and a second brake control signal of the second or right brake system are preferably matched or balanced with each other in such a way that a first brake friction force action determined by the first brake system and a second brake friction force action determined by the second brake system are essentially the same or identical. This allows the same braking effect to be achieved on both sides. This can compensate for different levels of wear or aging on one side of the vehicle.

If the device to be braked is driven by means of an electric drive motor, as is the case with an electric vehicle or a so-called hybrid vehicle, braking can also be performed by means of generator operation.

Furthermore, electrical braking may be provided if the device has an eddy current brake. In devices of this type, combined operation of these purely electrically acting braking options via generator operation or eddy current braking with an actual brake is provided. Initially, braking is performed by means of generator operation or eddy current braking, and then, when its effect begins to weaken, accordingly more braking is performed using the present brake system 1.

Since the braking effect during generator operation or eddy current braking is known very precisely and a smooth transition from braking by means of generator operation or eddy currents to braking by means of the present brake system 1 is provided, the actual braking effect of the present brake system 1 can thus be checked further. Particularly, the brake system further comprises an electric generator brake, and the control and monitoring unit 9 takes a generator braking torque of the generator brake into account when determining the brake temperature expectation values.

According to a further preferred embodiment, after completion of a braking process, the subsequent cooling behavior or the drop in temperature is recorded by means of the at least one brake temperature sensor 15. The model for determining the brake temperature expectation values can be easily adjusted or verified by evaluating the cooling behavior of the brake 2. Any effective hysteresis effects due to at least one phase transition in at least one of the components of the brake 2 can be taken into account. This means that behavior deviating from the factory settings, for example due to different rims or tires, can also be detected and the determination of the brake temperature expectation values can be adjusted accordingly.

The invention claimed is:

1. A brake system comprising at least one brake, the brake comprising:
    at least one friction surface;
    at least one pad carrier with at least one brake pad; and
    an actuating mechanism on which the pad carrier is mounted;
    wherein the brake system has a control and monitoring unit adapted to receive a braking effect request on the input side and to generate a brake control signal on a basis of the braking effect request and to output the brake control signal to a controller of the brake,
wherein the brake system comprises at least one brake temperature sensor, the at least one brake temperature sensor communicatively connected to the control and monitoring unit, the control and monitoring unit adapted to:
determine a temporal sequence of brake temperature expectation values on the basis of the braking effect request,
compare a temperature determined by the brake temperature sensor with a temporally corresponding value of the brake temperature expectation values,
determine at least one correction factor on the basis of a predeterminable deviation of the determined temperature from the corresponding value of the brake temperature expectation values, and
correct the brake control signal by the at least one correction factor, and to actuate the controller using the corrected brake control signal, and
wherein the brake system further comprises an electric generator brake, and in that the control and monitoring unit takes a generator braking torque of the generator brake into account when determining the brake temperature expectation values.

2. The brake system according to claim 1, wherein the at least one brake further comprises at least one adjusting device.

3. The brake system according to claim 2, wherein the at least one brake temperature sensor is arranged on at least one of:
the at least one pad carrier;
the friction surface;
the brake pad;
the actuating mechanism; and
the adjusting device.

4. The brake system according to claim 1, wherein values for at least one thermal resistance and at least one thermal capacity of the brake as well as relationships between braking effect request, braking torque, and thermal power are stored in a memory unit connected to the control and monitoring unit, and in that the control and monitoring unit determines brake temperature expectation values on the basis of these values and relationships.

5. The brake system according to claim 4, wherein a specifiable plurality of thermal resistances is further stored in the storage unit, and in that the various thermal resistances represent speed and/or ambient temperature dependent cooling effects.

6. The brake system according to claim 4, wherein a transfer function of the actuating mechanism is stored in the memory unit.

7. The brake system according to claim 1, wherein the brake system has at least one ambient temperature sensor for at least indirect determination of a temperature of a specifiable environment of a device to be braked with the brake system, which ambient temperature sensor is connected to the control and monitoring unit.

8. The brake system according to claim 1, wherein the brake system comprises at least one unit for determining an ambient air speed and/or a speed measuring system, which are connected to the control and monitoring unit.

9. The brake system according to claim 1, wherein the control and monitoring unit takes into account a specifiable time history when forming the correction factor.

10. The brake system according to claim 9, wherein the control and monitoring unit takes into account a specifiable number of discrete time-temperature values when forming the correction factor.

11. The brake system according to claim 9, wherein the control and monitoring unit generates the brake control signal taking into account at least one of:
at least one predeterminable dimension of at least one of the brake pad and the friction surface stored in a memory unit; and
at least one coefficient of friction for a pairing of the brake pad and the friction surface stored in the memory unit.

12. The brake system according to claim 11, wherein at least one of:
the at least one predeterminable dimension of at least one of the brake pad and the friction surface is an original dimension; and
the at least one coefficient of friction for the pairing of the brake pad and the friction surface is an original coefficient of friction.

13. The brake system according to claim 1, wherein the brake system is an electromechanical brake system, the brake further comprising at least one electric motor for specifiable moving of the pad carrier, which electric motor is further connected to the actuating mechanism, and in that the controller controls the electric motor.

14. The brake system according to claim 13, wherein the actuating mechanism has a mechanical input which is connected to the electric motor, in that the actuating mechanism has a mechanical output which is connected to the pad carrier, and in that the actuating mechanism is designed in such a manner that a movement at the input is related to a movement of the output via a specifiable non-linear relationship.

15. The brake system according to claim 1, wherein the brake system is designed without a force sensor.

16. A vehicle comprising at least one brake system, the at least one brake system comprising at least one brake, the brake comprising:
at least one friction surface;
at least one pad carrier with at least one brake pad; and
an actuating mechanism on which the pad carrier is mounted;
wherein the brake system has a control and monitoring unit adapted to receive a braking effect request on the input side and to generate a brake control signal on a basis of the braking effect request and to output the brake control signal to a controller of the brake,
wherein the brake system comprises at least one brake temperature sensor, the at least one brake temperature sensor communicatively connected to the control and monitoring unit, the control and monitoring unit adapted to:
determine a temporal sequence of brake temperature expectation values on the basis of the braking effect request,
compare a temperature determined by the brake temperature sensor with a temporally corresponding value of the brake temperature expectation values,
determine at least one correction factor on the basis of a predeterminable deviation of the determined temperature from the corresponding value of the brake temperature expectation values, and
correct the brake control signal by the at least one correction factor, and to actuate the controller using the corrected brake control signal, and wherein the brake system has at least a first and a second brake, in that the control and monitoring unit is adapted to determine independent brake temperature expectation values for the first brake and the second brake in each case on the basis of the braking effect request, and furthermore to compare the independently determined temperatures of the first and second brakes in each case with the respective temporally corresponding value of the brake temperature expectation values, to form independent first and second correction factors for the first and second brakes in each case, and to correct the brake control signals of the first and second brakes by the respective correction factor.

17. The vehicle according to claim 16, further comprising:
at least one sensor for determining at least one of an individual wheel speed and a wheel slip;
wherein the sensor is at least indirectly connected to the control and monitoring unit of the brake system, the control and monitoring unit adapted to compare one of the wheel speed and wheel slip determined by the sensor with at least one value for a corresponding operating behavior expectation during a braking process, and to adjust the at least one correction factor in an event of a specifiable deviation.

18. The vehicle according to claim 17, wherein the at least one sensor comprises at least one of:
a sensor of an ABS of the vehicle;
a sensor of an ESP of the vehicle; and
a rain sensor.

* * * * *